INVENTOR.
HIDEHARU HORIE
BY
*J.B. Felshin*
ATTORNEY

Nov. 3, 1970　　　　　HIDEHARU HORIE　　　　　3,537,110
DISAPPEARING BOWL
Filed Aug. 7, 1968　　　　　　　　　　　　　　　3 Sheets-Sheet 2
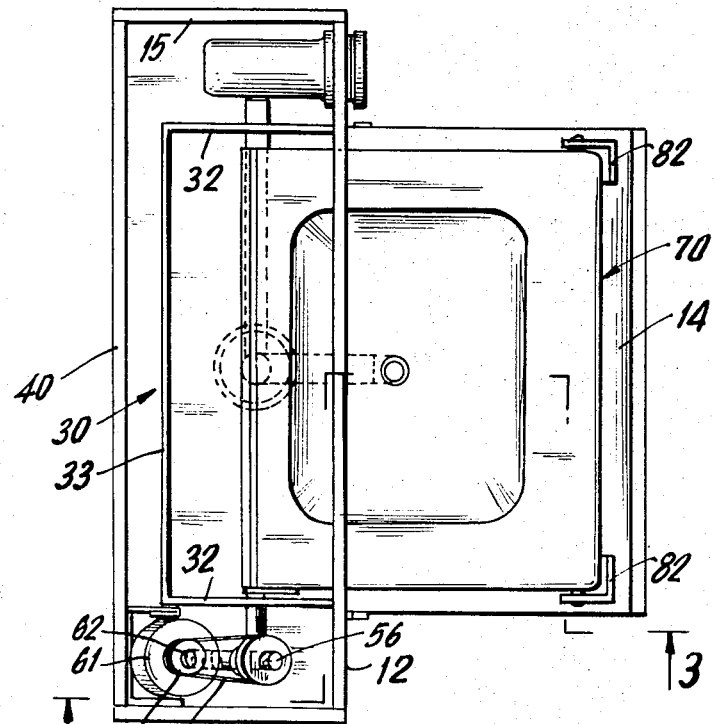
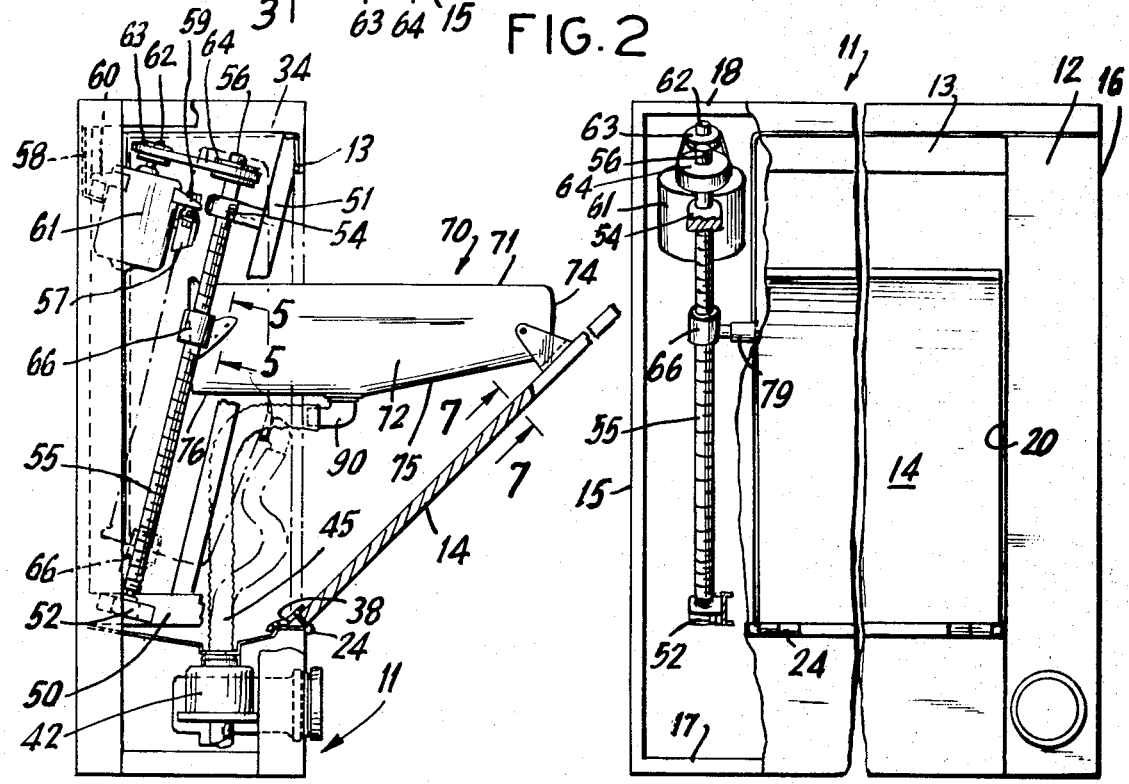
INVENTOR.
HIDEHARU HORIE
BY
J. B. Felshin
ATTORNEY Nov. 3, 1970　　　　HIDEHARU HORIE　　　　3,537,110
DISAPPEARING BOWL
Filed Aug. 7, 1968　　　　　　　　　　3 Sheets-Sheet 3
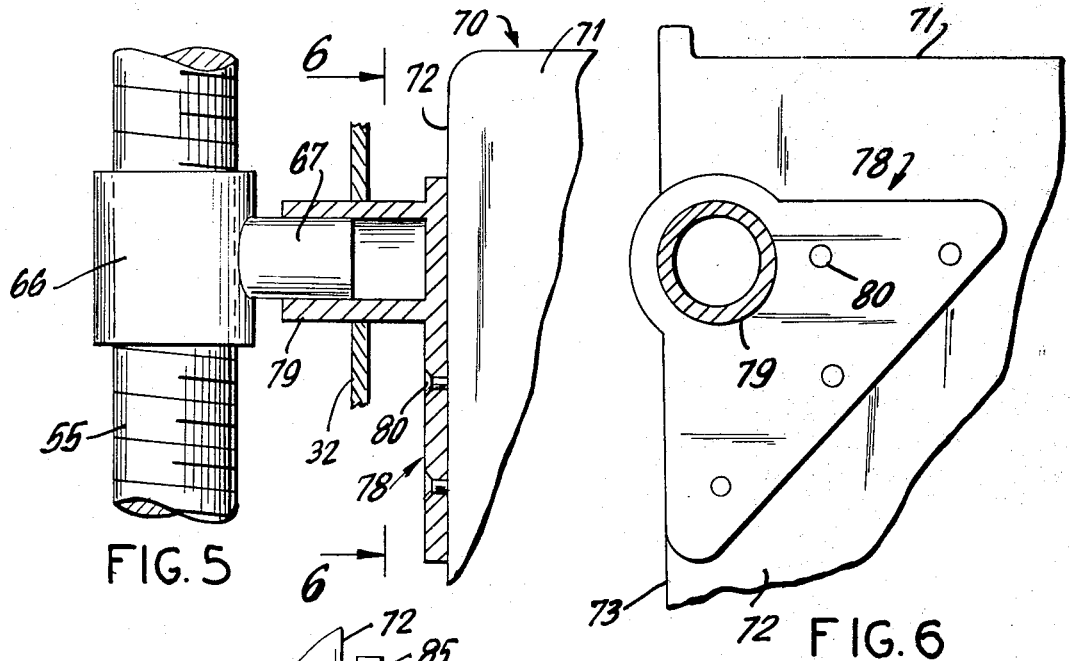
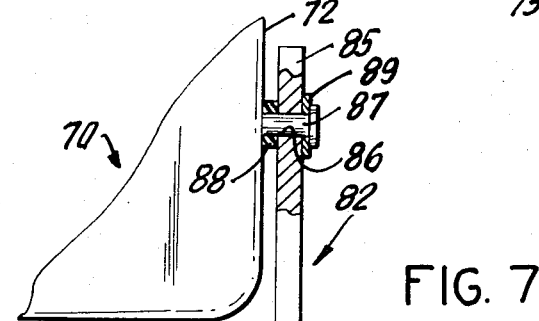
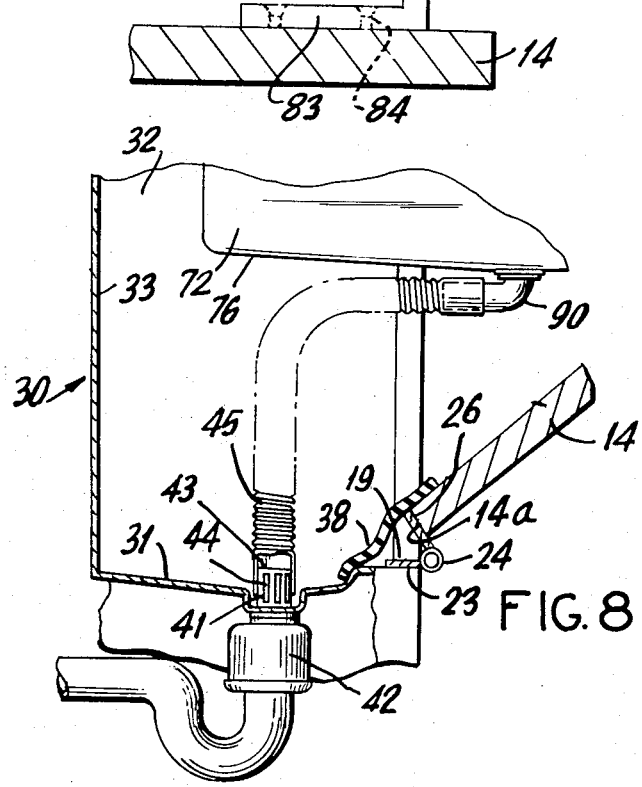
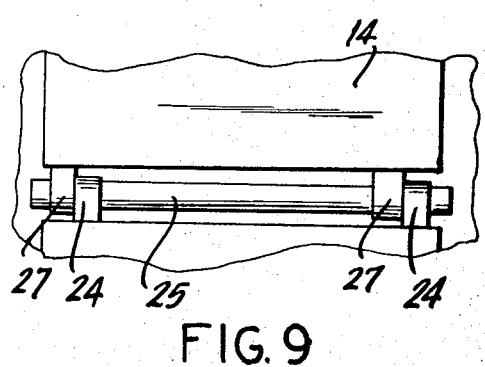
INVENTOR.
HIDEHARU HORIE
BY
J.B. Felchin
ATTORNEY

United States Patent Office 3,537,110
Patented Nov. 3, 1970

3,537,110
DISAPPEARING BOWL
Hideharu Horie, Osaka, Japan, assignor to Tokara Company, New York, Inc., Brooklyn, N.Y., a corporation of New York
Filed Aug. 7, 1968, Ser. No. 750,903
Int. Cl. A47k 1/04
U.S. Cl. 4—169
14 Claims

ABSTRACT OF THE DISCLOSURE

A cabinet is provided with a front door hinged at its lower end and swingable forwardly to open. A shampoo bowl is hinged at its front end to the upper end of the door. Swivelled to the rear end of the bowl, on a horizontal axis, is a nut threaded on a rotatably mounted screw. Rotation of the screw in one direction raises the nut and moves the bowl to horizontal position while the front of the bowl swings the door open to upwardly and forwardly inclined position, to support the front end of the bowl. Upon rotating the screw in an opposite direction, the nut moves down on the screw to swing the door to vertical closed position and the bowl into the cabinet. The bowl moves into a chamber in the cabinet. Said chamber has a drain at its lower end connected to the outlet of the bowl by a flexible conduit. Any water spilled into the chamber from the top of the bowl, when the bowl tilts into said chamber, also passes to the drain.

BACKGROUND OF THE INVENTION

Field of the invention

This invention relates to bowls which swing from concealed position of non-use to exposed operative position.

Description of the prior art

In the prior art bowls movable from horizontal to verticle positions, is known.

SUMMARY OF THE INVENTION

An object of this inveition is to provide a bowl construction of the character described which is exposed to view when in use, but which can be moved into a cabinet when not in use, and at the same time close a door to the cabinet to completely conceal the bowl within the cabinet.

Another object of this invention is to provide a construction of the character described in which the outlet of the bowl is connected to a drain by a flexible conduit which collapses when the bowl is moved into the cabinet.

Still another object of this invention is to provide a construction of the character described in which a chamber is provided, into which the bowl moves when tilted into the cabinet, said chamber being open only at the front with the drain at the bottom of the chamber, so arranged that if water spills from the top of the bowl into said chamber during tilting of the bowl, the spilled water will drop to the bottom of the chamber and go down the drain and will not spill out of the chamber through the door.

Yet another object of this invention is to provide in a construction of the character described, a rotatably mounted screw on which is threaded a nut swivelled to the rear end of the bowl on a horizontal axis and means to rotate the screw to lift or lower the nut on the screw for moving the bowl.

A further object of this invention is to provide in a construction of the character described, means to pivotally connect the front end of the bowl to the upper end of a door hinged to the cabinet at its lower end, so that as the nut is raised, the door is swung open to support the bowl in horizontal position, and as the nut is lowered, the rear end of the bowl comes down as the front end of the bowl moves inside the cabinet to shut the door.

Yet a further object of this invention is to provide motorized means for rotating the screw in opposite directions for raising and lowering the nut.

A still further object of this invention is to provide a strong and durable construction of the character described which shall be relatively inexpensive to manufacture, which shall be sure and positive in operation, neat in appearance, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

BRIEF DESCRIPTION OF THE DRAWING

In the accompanying drawing, in which is shown an illustrative embodiment of this invention.

FIG. 2 is a top view thereof, with the top cover removed;

FIG. 3 is a cross-sectional view taken on line 3—3 of FIG. 2;

FIG. 4 is a front elevational view of the cabinet with the door closed and with parts in cross-section;

FIG. 5 is an enlarged detailed view showing the connection of the screw, nut and bowl and taken on line 5—5 of FIG. 3;

FIG. 6 is a cross-sectional view taken on line 6—6 of FIG. 5;

FIG. 7 is a partial cross-sectional view taken on line 7—7 of FIG. 3;

FIG. 8 is a cross-sectional view taken on line 8—8 of FIG. 1; and

FIG. 9 is a front view of the hinge shown in FIG. 8.

DESCRIPTION OF THE PREFERRED EMBODIMENT

Figure 1:
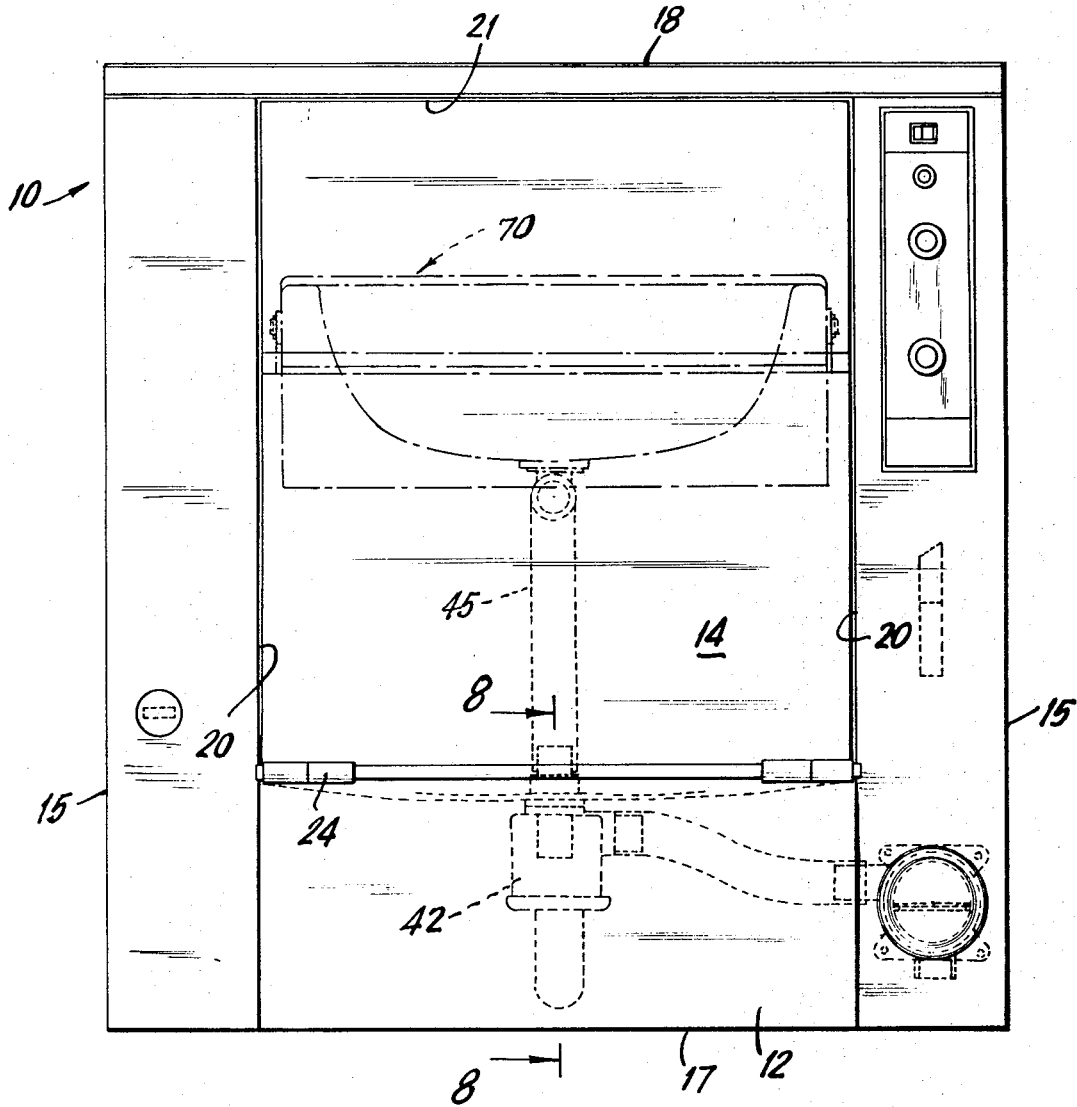
FIG. 1 is a front elevational view of a bowl and cabinet construction embodying the invention.

Referring now in detail to the drawing, 10 designates a bowl and cabinet assembly construction embodying the invention. The assembly comprises a cabinet 11 having a front wall 12 formed with a rectangular door opening 13 closed by a door 14. The cabinet 11 has side walls 15, 16, a bottom wall 17 and a top wall 18. The door opening 13 has a lower edge 19, parallel vertical side edges 20 and a top edge 21. A pair of hinge members 22 have wings 23 attached to the lower edge 19 with sleeves 24 projecting forwardly of front wall 12. A hinge rod 25 is supported in sleeves 24. Attached to the lower edge 14a of the door 14 are a pair of hinge members 26 having sleeves 27 through which hinge rod 25 passes. When the door 14 is in vertical closed position the hinge members 23, 26 are in the same plane.

Fixed to the front wall 12 is a chamber 30 comprising a bottom wall 31 extending rearwardly from the lower edge 19 of the door opening. Extending upwardly from said bottom wall are integral side walls 32 and a rear wall 33 connected at their upper ends by a top wall 34 which extends to the upper edge 21 of the door opening.

A rubber or rubber-like gasket 38 is attached to the inside of the lower end of door 14 and lies on the adjacent portion of the bottom wall 31 to prevent water from spilling out beneath the door when it is open.

The cabinet may have a rear wall 40 disposed rearwardly of rear wall 33 of chamber 30.

Bottom wall 31 of said chamber 30, has a depressed central well 41 formed with an opening to which a drain or trap 42 of standard construction, is connected and extends downwardly.

Extending upwardly from the opening in the well 41 and communicating therewith is a sleeve 43 formed with longitudinal slots 44. The bottom wall 31 slants downwardly to the well 41 so that any water dropping down into the chamber 30 will run to the well and pass through the slots 44 down into the drain or trap 42. Fitted to the upper end of the sleeve 43 is a flexible conduit 45, the purpose of which will be explained hereinafter.

Disposed between one side wall 32 of the chamber 30 and the adjacent side wall 15 of the cabinet, is a cross-support 50. The support 50 may be of channel shaped construction. Connecting the cross-support 50 with the upper end of front wall 12 is an upwardly and forwardly inclined frame support 51 which may likewise be of channel shaped construction. Attached to support 50 is a trust bearing 52 having an upwardly and forwardly inclined axis. Adjacent the upper end of the frame support 51 there is fixed a bearing 54 coaxial with the bearing 52. Journalled in the bearing 54 and engaging the bearing 52 is an upwardly and forwardly inclined screw threaded shaft 55. Fixedly mounted on the upper end of the screw shaft 55 is a pulley 56. Attached to the outer side of said wall 32 is a support 57. Supported on the back wall 40 is a support 58. Mounted on the supports 57, 58, in any suitable manner, are brackets 59 and 60 respectively, supporting a reversible electric motor 61 having an upwardly and forwardly inclined armature shaft 62 parallel to the screw 55. On shaft 62 is a pulley 63 belted to the pulley 56 by belt 64. Threaded on the screw 55 and disposed between the bearing 54 and 52, is a nut 66 (see FIGS. 3, 4 and 5). Extending from the nut 66, at right angles thereto, is a round stud shaft 67.

Supported partly by the nut 66, in the manner hereinafter explained, is a bowl 70. This may be a barber or beauty parlor shampoo bowl or any other type of bowl. The bowl 70 has a top surface 71, side surfaces 72, rear surfaces 73 and a front surface 74. Said bowl has at its front end an upwardly and forwardly inclined undersurface 75 and at its rear end a substantially horizontal undersurface 76. Attached to one side surface 72 (FIGS. 5 and 6) is a bracket 78 provided with a horizontal outwardly extending sleeve 79 passing through wall 32 and rotatably receiving the stud shaft 67. The bracket 78 may be of generally triangular shape and may be attached by bolts, screws or other fasteners 80.

Attached to the inside of the door 14 are a pair of similar symmetrically disposed brackets 82 for pivotal attachment to the front end of the bowl. Each bracket 82 is of angular construction and has a wall 83 attached to the inside of the door 14 by screws, bolts or any other fastening means 84. Extending from wall 83 is a vertical wall or flange 85 disposed close to the side surfaces 72 of the bowl. Each wall 85 is formed with a bearing opening 86. Fixed to the bowl at the surfaces 72 thereof and extending outwardly therefrom, are headed pins 87 journalled in the openings 86. A rubber gasket 88 received on each pin is interposed between the wall 85 and the surface 72. A snap washer 89 is interposed between the head of each pin 87 and the wall 85. It will now be understood that as the motor rotates the screw in one direction, the nut moves down from the full line to the dotted line position of FIG. 3, causing the door to swing upwardly to vertical position in which position the bowl is completely concealed within the cabinet and the door is shut, providing a neat closed surface to the cabinet. Attached to the bottom of the bowl is an outlet fitting 90 to which the conduit 45 is attached at its upper end. When the motor rotates the screw 55 in an opposite direction, the nut rides up on the screw causing the front end of the bowl to move forwardly and the rear end to move forwardly and upwardly thereby pushing the door open.

Suitable limit switches may be provided to open the circuit for the motor when the bowl reaches the limit of its opened and closed positions. Obviously the motor may be controlled by manual switches, if desired.

Instead of an electric motor, the screw 55 may be rotated manually by means of a hand crank (not shown). Water may be supplied to the bowl in any suitable manner.

It will thus be seen that there is provided an article in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. In combination, means to provide a vertical door opening, a door, means to hinge the lower end of said door to said means at the lower end of said door opening, and said door being movable from a verticle closed position thereof, to an upwardly and forwadly inclined, open position thereof, a bowl, means to hinge the front end of said bowl to the back of said door, with said bowl depending from its hinged end when the door is closed, and means to swing the rear end of said bowl away from said door about said means which hinges the bowl to the door, in a direction to move said bowl from closed position in back of said door to a substantially horizontal open position for use, and to thereby swing said door from its closed to its open position.

2. The combination of claim 1, said means for moving the rear end of said bowl, comprising a screw, fixed bearing means to mount said screw for nonlongitudinal, rotational movement about its axis, a nut on said screw and means to rotatably mount said nut on said bowl adjacent the rear end of said bowl.

3. The combination of claim 1, a chamber attached to the rear of said door opening forming means and enclosing said bowl when said door is closed.

4. The combination of claim 3, said bowl having an outlet which moves when said bowl moves from closed to open position, said chamber having a fixed bottom wall provided with a drain means spaced from said outlet, and a flexible conduit connecting said drain means to the outlet of said bowl, said conduit flexing when said bowl moves from closed to open position.

5. The combination of claim 4, and means to allow water spilled onto said bottom well, to flow into said drain means.

6. The combination of claim 1, said door hinge means, and said bowl hinge means being disposed on parallel axes.

7. The combination of claim 2, said door hinge means said bowl hinge means and the means to rotatably mount said nut on said bowl, all being disposed on parallel axes.

8. The combination of claim 1, said screw being inclined upwardly and forwardly, the direction of movement of the rear end of said bowl being upwardly and forwardly and the direction of movement of the front end of the bowl being forwardly and downwardly, when said bowl moves from its closed to its open position.

9. The combination of claim 2, a chamber attached to the rear of said door opening forming means and enclosing said bowl when said door is closed, and said screw being located outside of said chamber, and said means to rotatably mount said nut on said bowl passing through a wall of said chamber.

10. The combination of claim 5, and a flexible waterproof sheet attached to the lower end of the back side of the door and overlapping the upper surface of said bottom wall of said chamber.

11. The combination of claim 9, said bowl having an outlet, said chamber having a fixed bottom wall provided with a drain means spaced from said outlet, a flexible conduit connecting said drain means to the outlet of said bowl, and means to allow water spilled onto said bottom wall, to flow into said drain means.

12. The combination of claim 11, and a flexible waterproof sheet attached to the lower end of the back side of the door and overlapping the upper surface of said bottom wall of said chamber.

13. The combination of claim 11, said door hinge means, said bowl hinge means and the means to rotatably mount said nut on said bowl, all being disposed on parallel axes.

14. The combination of claim 13, said direction of movement of the rear end of said bowl being upwardly and forwardly, said door in its open position being inclined upwardly and forwardly.

References Cited

UNITED STATES PATENTS

| | | | |
|---|---|---|---|
| 2,076,950 | 4/1937 | Koch | 4—9 |
| 2,536,540 | 1/1951 | Davis | 4—176 |
| 3,040,137 | 6/1962 | Simmons | 312—25 XR |
| 3,320,698 | 5/1967 | Hummel | 49—340 |

FOREIGN PATENTS 641,242   7/1928   France.

FRED C. MATTERN Jr., Primary Examiner

R. J. SHER, Assistant Examiner

U.S. Cl. X.R.

49—340; 312—22